United States Patent
Deppe

(10) Patent No.: US 7,431,113 B2
(45) Date of Patent: Oct. 7, 2008

(54) AGRICULTURAL MACHINE WITH ENERGY RESERVOIR FOR OVERCOMING PEAK LOADS

(75) Inventor: Markus Deppe, Bielefeld (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 187 days.

(21) Appl. No.: 11/052,604

(22) Filed: Feb. 7, 2005

(65) Prior Publication Data
US 2005/0178100 A1 Aug. 18, 2005

(30) Foreign Application Priority Data
Feb. 17, 2004 (DE) .................... 10 2004 007 837

(51) Int. Cl.
*B60K 1/00* (2006.01)
*B60K 16/00* (2006.01)

(52) U.S. Cl. .................. 180/65.3; 180/65.8; 180/900; 340/684

(58) Field of Classification Search ............... 180/65.2, 180/65.3, 65.4, 65.6, 65.7, 235, 242, 248, 180/315, 9.36, 307, 65.8, 900; 701/50, 208, 701/213, 22; 903/910, 923, 942; 340/684, 340/667, 685, 457; 56/14.7, 10.8, 203, 16.8
See application file for complete search history.

(56) References Cited

U.S. PATENT DOCUMENTS

| 3,565,202 | A | * | 2/1971 | Evans et al. ................ 180/65.4 |
| 3,720,446 | A | * | 3/1973 | Kelley ........................ 180/65.3 |
| 3,736,736 | A | * | 6/1973 | Myers ......................... 56/16.6 |
| 4,191,270 | A | * | 3/1980 | Monteith .................... 180/315 |
| 4,662,472 | A | * | 5/1987 | Christianson et al. ...... 180/65.7 |
| 5,123,234 | A | * | 6/1992 | Harada et al. ............. 56/10.2 E |
| 5,215,056 | A | * | 6/1993 | Harada et al. ............... 477/109 |
| 5,335,487 | A | * | 8/1994 | Murakawa et al. .......... 56/10.5 |
| 5,533,676 | A | * | 7/1996 | Conley ....................... 56/16.8 |
| 5,847,470 | A | * | 12/1998 | Mitchell .................... 180/65.2 |
| 5,887,671 | A | * | 3/1999 | Yuki et al. ................. 180/68.1 |
| 5,890,545 | A | * | 4/1999 | Smith et al. ............... 180/65.1 |
| 5,947,855 | A | | 9/1999 | Weiss |
| 5,995,895 | A | * | 11/1999 | Watt et al. ................... 701/208 |
| 6,052,978 | A | | 4/2000 | Kempf |
| 6,098,386 | A | * | 8/2000 | Shimizu et al. ............. 56/14.7 |
| 6,189,641 | B1 | * | 2/2001 | Azuma ........................ 180/242 |
| 6,320,497 | B1 | * | 11/2001 | Fukumoto et al. ........... 340/438 |

(Continued)

FOREIGN PATENT DOCUMENTS

DE 196 23 738 12/1997

(Continued)

*Primary Examiner*—Hau V Phan
(74) *Attorney, Agent, or Firm*—Michael J. Striker

(57) ABSTRACT

The agricultural machine has at least one energy producer (19); at least one energy storage device; at least one working unit (2, 4, 7, 8, 15, 16, 17) driven by the at least one energy producer (19) and at least one electric drive unit (20) associated with the at least one energy producer (19). The at least one electric drive unit (20) controls the energy supply of the at least one working unit (2, 4, 7, 8, 15, 16, 17) according to energy requirements of the at least one working unit (2, 4, 7, 8, 15, 16, 17) since it supplies energy to or takes it from the at least one energy storage device (29) as needed.

12 Claims, 2 Drawing Sheets

U.S. PATENT DOCUMENTS

| | | | |
|---|---|---|---|
| 6,397,966 B1 * | 6/2002 | Irikura et al. | 180/307 |
| 6,425,450 B1 * | 7/2002 | Lansberry | 180/9.36 |
| 6,508,523 B2 * | 1/2003 | Yoshino | 903/903 |
| 6,513,312 B1 * | 2/2003 | Ishimori et al. | 56/203 |
| 6,540,633 B1 * | 4/2003 | Hasegawa et al. | 180/6.44 |
| 6,568,162 B2 * | 5/2003 | Walters | 56/10.8 |
| 6,629,026 B1 * | 9/2003 | Baraszu et al. | 701/22 |
| 6,690,285 B2 * | 2/2004 | Schafer et al. | 340/684 |
| 6,726,588 B2 * | 4/2004 | Weisz | 903/910 |
| 6,729,423 B2 * | 5/2004 | Kobayashi et al. | 180/65.3 |
| 6,755,264 B2 * | 6/2004 | Hasegawa et al. | 180/6.2 |
| 6,827,164 B2 * | 12/2004 | Palumbo et al. | 180/65.1 |
| 6,935,451 B2 * | 8/2005 | Bell et al. | 180/65.5 |
| 7,017,327 B2 * | 3/2006 | Hunt et al. | 56/14.7 |
| 7,040,445 B2 * | 5/2006 | Ishii et al. | 180/307 |

FOREIGN PATENT DOCUMENTS

| | | |
|---|---|---|
| DE | 197 49 074 A1 | 5/1999 |
| WO | WO 99/48353 | 9/1999 |

\* cited by examiner

AGRICULTURAL MACHINE WITH ENERGY RESERVOIR FOR OVERCOMING PEAK LOADS

CROSS-REFERENCE TO A RELATED APPLICATION

The invention described and claimed hereinbelow is also described in German Patent Application DE 10 2004 007 837.8 filed on Feb. 17, 2004. This German Patent Application, whose subject matter is incorporated here by reference, provides the basis for a claim of priority of invention under 35 U.S.C. 119(a)-(d).

BACKGROUND OF THE INVENTION

1. Field of the Invention

The present invention relates to an agricultural machine comprising at least one energy producing device, which drives at least one working unit of the agricultural machine and at least one energy source.

2. Description of the Related Art

Agricultural machines are subjected to considerable loads during harvesting. All working units, such as cutter bars, chopper drums or conditioning rollers, of a self-powered forager harvester are greatly loaded by the crop to be harvested. The rotation speeds of the working units must be kept constant in order to guarantee unobjectionable processing of the crop. Especially the motor speed of agricultural machines strongly fluctuates because of non-uniform crop conditions. Thus the engine power requirements fluctuate depending on the amount of the crop fed to the working units. This has the result that the engine is very greatly loaded with very thick crop conditions and the operator must reduce the engine speed, in order to avoid overloading the engine. It is problematic that frequently this action is not performed quickly enough, so that the working units are clogged or the crop quality is poor. On the other hand, the operator must act correctly even with less dense crops, and for example increase the speed so that the engine load is optimum.

EP1 065 920 B1 discloses a supply device or unit with at least one rotatably driven feeder in a self-powered forager harvester and a mechanical gear mechanism, which is designed as a planetary gear device and has a planet carrier, a sum wheel and a ring gear as its parts. Each part of the planetary gear device is in working connection with a mechanical drive and the feeder.

The mechanical drive should be improved by the arrangement of the different parts. A higher efficiency should be attained because of the mechanical gear mechanism and the rotational speed change of the engine because of the power transmission. Thus the main power should be applied through the mechanical gear mechanism, so that the engine only needs to provide a minimal power to the gear mechanism and thus can be kept comparatively small.

However the subject matter of the invention disclosed in EP 1 065 920 B1 only includes improvements for the mechanical drive. The energy consumption itself remains high and unchanged and is not adjusted to the actual requirements of the agricultural machine at any point. Improved energy consumption is not achieved by the arrangements of the parts. The energy is produced by the engine and is conducted into the mechanical gear mechanism, from which it is supplied to the working units of the agricultural machine and immediately converted or transformed. The energetic support is not provided by additional power reserves.

SUMMARY OF THE INVENTION

It is an object of the present invention to provide an improved agricultural machine in which energy from the drive system is received and stored in an energy storage device so that reserve power can be provided and is available for the drive system.

This object and others which will be made more apparent hereinafter is attained in an agricultural machine comprising at least one energy producer, at least one energy storage device and at least one working unit driven by the at least one energy producer.

According to the invention the at least one energy producer is associated with at least one electric drive unit and the at least one electric drive unit controls an energy supply of the at least one working unit according to energy requirements of the at least one working unit.

Since the at least one electric drive unit is associated with the at least one energy producer and has means for controlling an energy supply of the at least one working unit according to the energy needs thereof, additional energy in the drive system can be supplied. Since the energy storage occurs in the drive system, especially during power fluctuations, such as rotation speed fluctuations of the chopper drum of the self-powered forager harvester, the agricultural harvesting machine can operate at a constant power level. For this purpose the constantly varying power needs of the harvesting machine are compared with the supply of additional energy. Moreover the fluctuations of the various loads occurring are reduced because of the reductions in the rotation speed fluctuations achieved by the features of the invention.

Rotation speed fluctuations are balanced by continually turning the electric drive on and off during power need fluctuations.

Because the at least one electric drive is turned on and off according to the energy requirements of the at least one other energy producer, the rotation speeds of the working units driven by the energy producer can be kept constant. Hereby the energy producer, which can be designed as an internal combustion engine, is less heavily loaded. Also fuel is saved and the driver is relieved since the operation can be continued unchanged at a constant travel speed.

By supplying energy to the energy storage device, such as a battery, by means of the electric drive unit, an additional energy reserve is provided, which can be used in addition to the energy produced by the internal combustion engine. Hereby the drive system can be provided with additional energy. The relief of the entire operating system from load peaks is of considerable significance.

When the control of the energy requirements can be adjusted according to the energy requirements, the driver of the agricultural machine can exactly establish the threshold value for the energy supplied and thus perform an adjustment to the actual harvest conditions in order to optimize the burden on the entire agricultural machine.

By the adjustable turning on and turning off of the at least one electrical drive unit according to energy requirements of the at least one energy producer and/or working unit, when the power reserve should be used and how much energy supplied to the other energy producers and/or working units must be supplied during power fluctuations can be exactly controlled. As a result the working units can be controlled, so that they have e.g. constant rotation speed. Also the rotation speed fluctuations can be reduced by the desired storage and delivery of energy.

The automatic turning on and off of the at least one electrical drive unit leads to a relief of the driver of the agricultural machine. Thus the harvest travel can be performed, without the driver considering a number of power or energy consumption parameters, in order to optimize the burden on the agricultural machine.

Since energy is removed from the at least one working unit and/or energy producer and is supplied to the energy storage device, an additional energy reserve is provided. Because of that reserve the stored energy can be used at any arbitrary point in the agricultural machine. Otherwise the energy would always need to come from the energy directly produced by the internal combustion engine.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
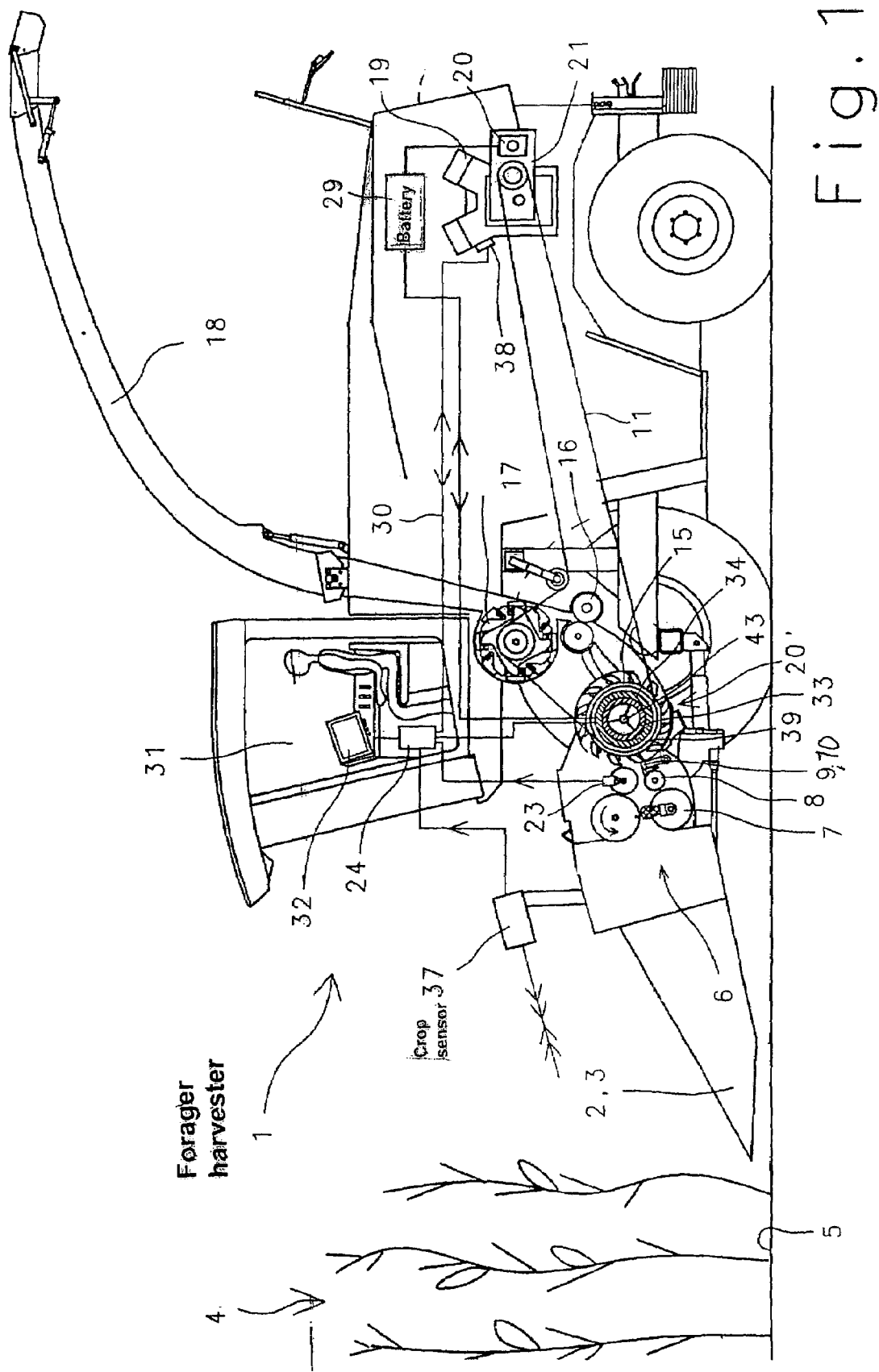
FIG. 1 is a schematic side view of a self-powered forager harvester according to the invention.

FIG. 1 is a schematic side view of a self-powered forager harvester according to the invention.

The front attachment 2 mounted on the front end of the forager harvester 1, which is primarily formed as a corn header 3, is replaceable according to the respective type of crop 4 and takes in the crop 4 from the ground 5, chops it up and supplies it to the connected working units 7, 8, 15, 16 and 17.

A crop sensor 37 for detecting the crop condition without contacting the crop is associated with the front attachment 2. The sensor 37 detects how much of the crop 4 is fed into the working units and changes the travel speed of the self-propelled forager harvester, the rotation speeds of the working units 7, 8, 15, 16, 17 or the rotation speed of the engine 19 in a generally known manner.

The front attachment 2, which has a width of several meters, conducts the crop 4 that it takes in into a feeder region 6. The crop 4 is taken through the feeder region 6 by a first compression roller pair 7 and compressed or compacted. A second compression roller pair 8 follows the first compression roller pair 7, which compacts or compresses the compressed crop 4 further to a crop stream, and the crop stream is feed to cutting knives 10 of the chopper drum 15 over a ledger plate 9. The crop 4 is cut up by the cutting knives 10 at the opposing ledger plate 9 arranged in front of the chopper drum 15 and transported to a conditioning roll pair 16 following the chopper drum 15 before the processed crop 4 is accelerated by the discharge accelerator 17 and ejected from the forager harvester 1 through the subsequently connected discharge chute 18.

All working units 2, 7, 8, 15, 16, 17 are driven by an internal combustion engine 19 of the forager harvester 1 acting as energy producer. For example, the engine 19 drives the chopper drum 15 by means of a main drive belt 11 engaged with and passing around a belt disk 39 of the drum 15.

A summing gear unit 21 associated with the engine 19 manages the engine 19 and the electric drive 20 together. The electric drive 20 is connected with an energy storage device, which for example can be a battery 29.

The electric drive 20 takes energy from the drive system and stores this energy in the battery 29. The battery 29 is thus charged and has an additional energy reserve. The reserve is available for operation of the machine. The stored energy can be supplied to the drive system as needed from this energy reserve in order to overcome problematic power peaks.

The electric drive 20 can take energy from the drive system, since it engages when there is a work or power reduction in the drive system. The electric drive 20, like a generator, can take energy from the drive system due to reduction in work performed and thus operate as a brake. This energy taken from the drive system can be fed to the battery 29. When a reduction of the drive work of the entire drive of the agricultural machine should occur, it can be controlled by means of the electric drive 20 and the energy produced can be supplied to the battery 29 as an additional power reserve and stored there.

Energy supplied to it can be retrieved by means of the electric drive 20 as needed and supplied to the common summing gear unit 21 of the electric drive 20 and the engine 19 via the electric drive 20. However in contrast to the engine 19 the electric drive 20 only conducts energy into the summing gear unit 21 if it is needed. The conditions under which this energy is needed can be defined in various ways. Thus the electric drive 20 can be automatically turned on depending on the energy consumption of at least one working unit 2, 4, 7, 8, 15, 16, 17. In this way the electric drive 20 controls the energy supply of the at least one working unit 2, 4, 7, 8, 15, 16, 17 according to the actual energy needs of the respective working units 2, 4, 7, 8, 15, 16, 17. Accordingly, for example the rotation speed of the chopper drum 15 can be set at a certain set rotation speed. This set rotation speed acts as threshold value for control of the energy supply from the storage device 29. As soon as the speed falls below this threshold value, e.g. by traveling into a dense crop to be harvested thus causing a rotation speed decrease, the electric drive 20 turns on and supplies additional energy from the battery 29 to the summing gear unit 21. This additional energy is distributed to the distributing gears 22 together with the engine energy and ultimately to the chopper drum 15. The energy storage device 29 thus acts to compensate the rotation speed fluctuations. Also rotation speed compensation is performed in order to maintain the rotation speed constant as much as possible. In this way problematic power peaks are successfully overcome, without rotation speed fluctuations, especially rotation speed drops, occurring which impair the quality of the chopping. The rotation speeds are measured by generally known rotation speed sensors 23 on the respective working units 2, 4, 7, 8, 15, 16, 17 and rotation speed signals from them are conveyed to an analysis unit 24, which controls the electric drive 20. Instead of a rotation speed sensor 23 other generally known measurement devices, for example a moment sensor, can be used.

According to the invention the electric drive 20 should take the energy from the energy storage device 29 and conduct it in the same circumstances into the summing gear unit 21 and then supply it to the respective working units 2, 4, 7, 8, 15, 16, 17, when the rotation speeds of the respective working units 2, 4, 7, 8, 15, 16, 17 fall below their set values.

Quiet operation of the agricultural machine 1 and its working units 2, 4, 7, 8, 15, 16, 17 is achieved by keeping the rotation speeds of the working units constant.

In order to attain an optimum control of the electric drive 20 an electronic engine controller 38 can be associated with the engine 19, which is connected with an analysis unit 24 by means of a BUS system 30, which processes the received motor signals and displays them on an operator's terminal 32 integrated into the driver's cabin 31 of the agricultural machine 1. The analysis unit 24 is moreover connected with the sensor 37 and at least one working unit 15. It takes the signal produced in the sensor 37 and processes it. As a consequence a permanent information exchange regarding the essential operation parameters occurs within the agricultural machine, which can be controlled accordingly by the driver of the agricultural machine at the operator's terminal 32. These signals are similarly used for the rotation-speed- or energy-requirement-dependent storage or delivery of energy according to the received signals.

In a special embodiment the electric drive 20' is associated with the chopper drum 15. The electric drive 20' is, among other things, formed by a rotor 33 and an annular stator 34 around the rotor. The rotor 33 of the electric drive 20' is rigidly attached to the chopper drum shaft 43. When the rotation speed of the chopper drum 15 drops or falls, the electric drive 20' brakes the rotating chopper drum 15 partially or brings it to a complete stop. The converted kinetic energy of the chopper drum 15 is transformed by the electric drive 20' according to generator principles into a voltage for charging the electric energy storage device 29, which is a battery.

Since the drive of the forager harvester 1 is shut off after finishing the work on the field, the chopper drum 15 continues to rotate however because of its own rotation, the electric drive 20' can also be used as a sort of safety switch for the working units, since the electric drive 20' automatically engages after shutting off the forager harvester drive and brakes the rotation of the chopper drum 15, the chopper drum 15 comes to a stop and the energy taken thereby is fed to the battery 29.

The braking operation and the energy fed to the battery 29 connected with it can not only be used in relation to the rotating chopper drum 15, but also for any of the moving parts of the forager harvester 1. Furthermore no problems are encountered with using the braking energy conversion according to the invention and the supply of the energy stored in the energy storage device in other machines, for example a combine and its working parts, such as the threshing drum, etc.

Figure 2:
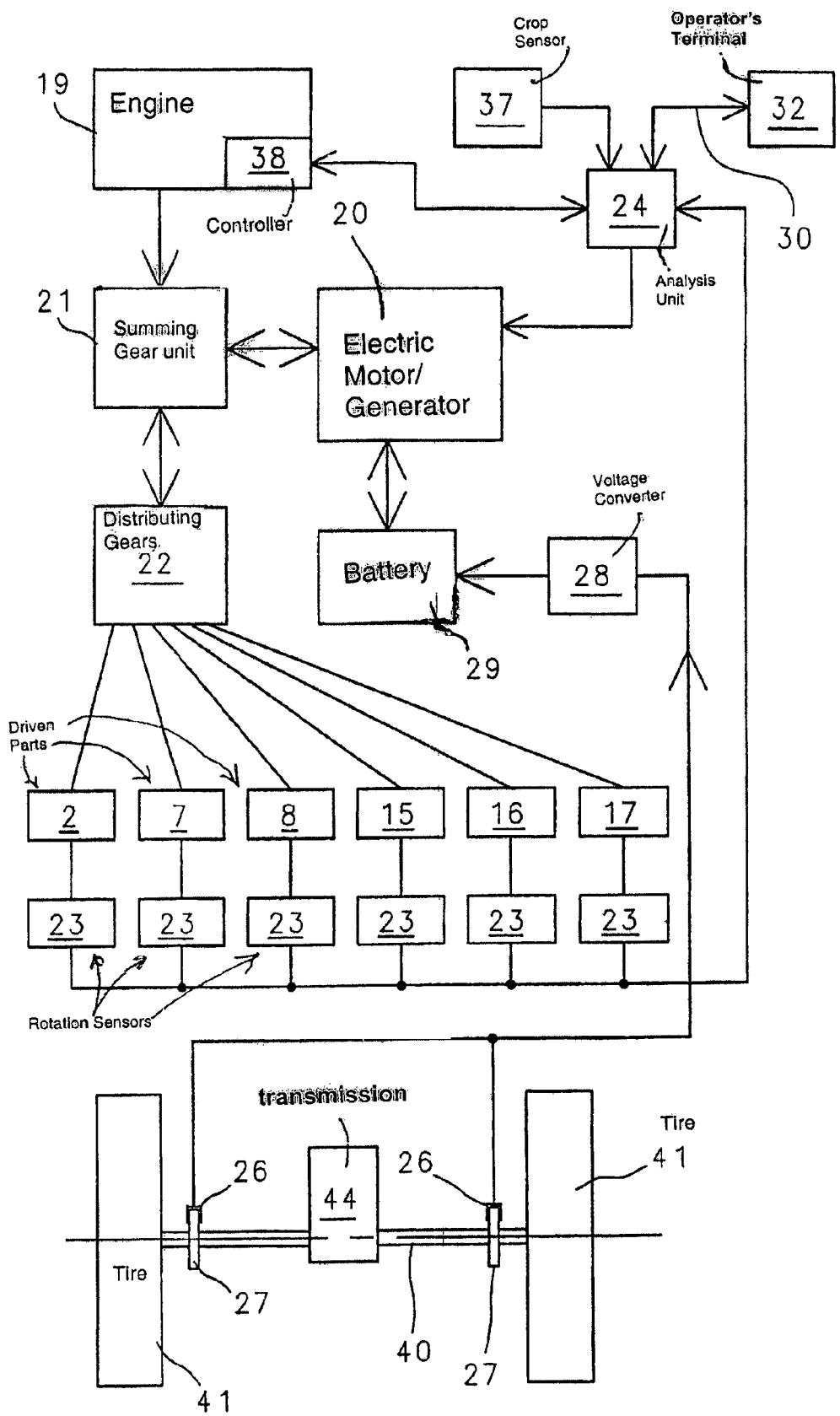
FIG. 2 is flow chart showing energy flow between components of the self-powered forager harvester according to FIG. 1.

The operation principles of the basic invention are shown in a simplified manner in FIG. 2. A drive system, which comprises a transmission 44, brake shoes 26 and brake disks 27 mounted on the drive shaft 40 and tires 41, is shown in FIG. 2. The energy flow is shown diagrammatically in FIG. 2. The electric drive 20 is associated or connected by means of a summing gear unit 21 with the engine 19, which can be a gasoline-powered or diesel internal combustion engine.

The engine 19 continuously produces energy during operation of the forager harvester 1 and conducts it into a summing gear unit 21. The summing gear unit 21 conducts the energy further to distributing gears 44, which feeds the energy to different working units 2, 4, 7, 8, 15, 16, 17. According to the invention the summing gear unit 21 manages the engine 19 together with the electrical drive 20. The supply of energy to the battery 29 by the electric drive 20 occurs in the manner described above. When the work required of one or more of the working units 2, 4, 7, 8, 15, 16, 17 is greater than that supplied by the engine 19, the electric drive 20 is turned on and supplies the reserve energy stored in the battery 29 to the summing gear unit 21. The entire process can occur automatically to relieve the driver and to optimize the work load on the agricultural machine 1.

Alternatively it is conceivable that the driver of the agricultural machine 1 could manually turn the electric drive 20 on or off. The driver of the forager harvester 1 could read the rotation speed conditions at the different working units 2, 4, 7, 8, 15, 16, 17 off the operator's terminal 32 in the driver's cabin 31 and manually turn on the electric drive 20 as required, in order to increase or decrease the rotation speed.

It is also conceivable within the scope of the present invention to take energy from other working units, such as the driven drive unit 44, 40, 26 and 27. Thus the energy produced at the brake shoes 26 on to the brake disks 27 of the forager harvester 1 during braking could be taken and transformed in a voltage converter 28, before the obtained energy is supplied to a battery 29.

In order to save space the electric drive 20 and an associated battery 29 could be associated directly with the respective working units 2, 4, 7, 8, 15, 16, 17. This arrangement permits a short and rapid energy flow between the electric drive 20 and the respective working units 2, 4, 7, 8, 15, 16, 17 and thus produces reduced energy losses.

An electric drive 20 separate from the drive system and also from the engine 19 can be adjusted to the exact requirements of the consumers associated with it. Thus it is conceivable to arrange several electric drives 20 in an agricultural machine. In the present embodiment of the machine in the form of the forager harvester 1 the electric drive 20 can be used for example for a brief reversal of the working unit 7 so that required energy can be taken from the chopper drum 15.

The drive belt, which has a very large size in part because of strong work-load fluctuations, could be designed weaker or smaller, which reduces costs as well as saves space.

Also the electric drive 20 could use the energy stored in the battery 29 for quiet and rapid starting of the agricultural machine 1 and the associated working units 2, 4, 7, 8, 15, 16, 17, whereby the load on the engine 19 is considerably reduced.

Furthermore the electric drive can be used as an electric all wheel drive, wherein the electric drive 20 produces energy for storage in the battery 29 at reduced speeds and then supplies the energy from the battery 29 to the drive of the agricultural machine. The additional energy supplied to the drive axle is especially very useful over difficult terrain, such as in travel on a hill or slope.

Finally the invention described using the forager harvester 1 as an example can be used in any agricultural machine, for example in a combine and its working units, such as the thresher drum, straw chopper, etc., in order to obtain the described effects.

PARTS LIST 1 self-powered forager harvester
2 front attachment
3 corn header
4 crop
5 ground
6 feeder region
7 $1^{st}$ compression roller pair
8 $2^{nd}$ compression roller pair
9 ledger plate
10 cutting knives
11 main drive belt
15 chopper drum
16 conditioning roll pair
17 discharge accelerator
18 discharge chute
19 engine
20,20' electric drive
21 summing gear unit
22 distributing gears
23 rotation speed sensor
24 analysis unit 26 brake shoe
27 brake disk
28 voltage converter
29 battery
30 bus system
31 cabin
32 operator's terminal
33 rotor
34 stator
37 crop sensor
38 engine controller
39 belt disk
40 drive axle
41 tire
43 chopper drum shaft
44 transmission The disclosure in German Patent Application 10 2004 007 837.8 of Feb. 17, 2004 is incorporated here by reference. This German Patent Application describes the invention described hereinabove and claimed in the claims appended hereinbelow and provides the basis for a claim of priority for the instant invention under 35 U.S.C.119.

While the invention has been illustrated and described as embodied in an agricultural or farming machine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An agricultural machine comprising
at least one energy producer (19) which comprises an internal combustion engine;
at least one energy storage device (29) which comprises a battery;
a plurality of wheels for driving the agricultural machine;
a plurality of working units (2, 4, 7, 8,15,16,17) driven by the internal combustion engine; and
at least one electric drive unit (20) associated with the internal combustion engine, wherein the at least one electric drive unit (20) receives energy from the battery, wherein the battery is charged by energy recovered from a braking process of the agricultural machine, and wherein the at least one electric drive unit (20) comprises means for controlling an energy supply of at least some of the working units (2, 4, 7, 8,15,16,17) according to energy requirements of the at least one working unit (2, 4, 7, 8,15,16,17), wherein said at least one electric drive unit is configured to control and compensate variations in rotation speeds of said at least some of the working units when said rotation speeds fall below a predetermined threshold.

2. The agricultural machine as defined in claim 1, further comprising means for turning on and turning off the at least one electric drive unit (20) according to energy requirements of the at least some of the one working units (2, 4, 7, 8,15,16, 17).

3. The agricultural machine as defined in claim 1, further comprising means for turning on and turning off the at least one electric drive unit (20) according to energy requirements of the at least one energy producer (19).

4. The agricultural machine as defined in claim 1, wherein the at least one electric drive unit (20) supplies energy to an element selected from the group consisting of the at least one energy storage device (29),the at least one working unit (2, 4, 7, 8,15,16,17), and both.

5. The agricultural machine as defined in claim 1, wherein the at least one electric drive is associated with the at least one working unit (2, 4, 7, 8,15,16,17).

6. The agricultural machine as defined in claim 1, further comprising at least one rotation speed sensor (23) associated with the at least some of the working units and an analysis unit (24) connected with the at least one rotation speed sensor (23), and wherein said at least one rotation speed sensor (23) transmits at least one average rotation speed signal to the analysis unit (24) and the analysis unit (24) controls the at least one electric drive unit (20) in accordance with the at least one average rotation speed signal.

7. The agricultural machine as defined in claim 1, wherein said means for controlling said energy supply controls said energy supply according to both said energy requirements of said at least some of the working units and energy requirements of said at least one energy producer (19) and said means for controlling said energy supply is adjustable.

8. The agricultural machine as defined in claim 1, further comprising means for turning on and turning off the at least one electric drive unit (20) according to requirements selected from the group consisting of energy requirements of the at least one energy producer (19), said energy requirements of the at least some of the working units (2,4, 7, 8,15,16, 17), and both and said means for turning on and turning off is adjustable.

9. The agricultural machine as defined in claim 8, wherein said means for turning on and turning off operates automatically.

10. The agricultural machine as defined in claim 1, wherein said at least one electric drive unit (20) is connected with a battery and a summing gear unit (21).

11. The agricultural machine as defined in claim 1, further comprising a summing gear unit (21) associated with said at least one energy producer (19) and said at least one electric drive (20).

12. The agricultural machine as defined in claim 1, further comprising a distributing gear unit (22) and a common summing gear unit (21) for the distributing gear unit (22) and wherein the distributing gear unit (22) is associated with the at least some of the working units (2, 4, 7, 8,15, 16,17).

* * * * *